(12) United States Patent
Pereira da Silva et al.

(10) Patent No.: US 12,026,480 B2
(45) Date of Patent: Jul. 2, 2024

(54) SOFTWARE DEVELOPMENT AUTOMATED ASSESSMENT AND MODIFICATION

(71) Applicant: International Business Machines Corporation, Armonk, NY (US)

(72) Inventors: Marcos Francisco Pereira da Silva, Americana (BR); Flavia Janine Rosante Beo, Sao Caetano do Sul (BR); Joao Paulo Anibal Mondoni, Piracicaba (BR); Leandro Fachinelli, Campinas (BR); Marco Aurelio Stelmar Netto, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 182 days.

(21) Appl. No.: 17/528,534

(22) Filed: Nov. 17, 2021

(65) Prior Publication Data

US 2023/0153072 A1    May 18, 2023

(51) Int. Cl.
G06F 8/10    (2018.01)
G06N 20/00    (2019.01)

(52) U.S. Cl.
CPC .............. *G06F 8/10* (2013.01); *G06N 20/00* (2019.01)

(58) Field of Classification Search
CPC .................................. G06N 20/00; G06F 8/10
See application file for complete search history.

(56) References Cited

U.S. PATENT DOCUMENTS

| 8,347,276 | B2 | 1/2013 | Schadow |
| 8,370,803 | B1 | 2/2013 | Holler et al. |
| 8,972,948 | B2 | 3/2015 | Weigert |
| 9,111,040 | B2 | 8/2015 | Boden et al. |
| 9,182,945 | B2 | 11/2015 | Boden et al. |

(Continued)

FOREIGN PATENT DOCUMENTS

| CN | 112579046 A | 3/2021 |
| KR | 102117056 B1 | 5/2020 |

(Continued)

OTHER PUBLICATIONS

Matthias Jurisch et Applying Machine Learning for Automatic User Story Categorization in Mobile Enterprises Application Development, [Online], pp. 81-94, [Retrieved from Internet on May 4, 2024], <https://www.learntechlib.org/p/217796/>, (Year: 2020).*

(Continued)

*Primary Examiner* — Ziaul A Chowdhury
(74) *Attorney, Agent, or Firm* — CANTOR COLBURN LLP; Erik Johnson

(57) ABSTRACT

A computer-implemented method includes receiving, by a processing system, a user story for developing software. The processing system characterizes the user story to determine a plurality of attributes. The processing system classifies a complexity of the user story associated with the attributes. The processing system determines a history score of the user story based on a similarity of one or more previously analyzed user stories having a similar complexity. The processing system recommends one or more modifications to the user story to increase alignment of one or more attributes of the user story with the one or more previously analyzed user stories.

14 Claims, 9 Drawing Sheets

(56) References Cited

U.S. PATENT DOCUMENTS

| | | | |
|---|---|---|---|
| 9,262,126 | B2 | 2/2016 | Ghaisas |
| 10,001,975 | B2 | 6/2018 | Bharthulwar |
| 10,332,073 | B2 | 6/2019 | Abebe et al. |
| 2017/0364824 | A1* | 12/2017 | Boyer ...................... G06N 5/00 |
| 2018/0047080 | A1* | 2/2018 | Piccus ...................... G06F 8/20 |
| 2019/0050771 | A1 | 2/2019 | Meharwade et al. |
| 2020/0057632 | A1 | 2/2020 | Harsukhlal Sodha et al. |
| 2020/0125342 | A1* | 4/2020 | Dominiak .............. G06N 20/00 |
| 2022/0244937 | A1* | 8/2022 | Prasad ................... G06N 5/022 |
| 2022/0326913 | A1* | 10/2022 | Podder ..................... G06F 8/10 |

FOREIGN PATENT DOCUMENTS

| | | |
|---|---|---|
| TW | 202026916 A | 7/2020 |
| WO | 2014111825 A1 | 7/2014 |

OTHER PUBLICATIONS

Issa Atoum et al. "Towards Measuring User Experience based on Software Requirements", [Online], pp. 325-331, [Retrieved from Internet on May 4, 2024], <https://pdfs.semanticscholar.org/f3e6/90f2de9eab9609336b431cbc4a22a705aebd.pdf> (Year: 2021).*

Asaad Algarni et al. "Applying Software Design Metrics to Developer Story: A Supervised Machine Learning Analysis", [Online], pp. 156-159, [Retrieved from Internet on May 4, 2024], <https://ieeexplore.ieee.org/stamp/stamp.jsp?tp=&arnumber=8998779> (Year: 2019).*

Dalpiaz, et al., Pinpointing Ambiguity and Incompleteness in Requirements Engineering via Information Visualization and NLP, International Working Conference on Requirements Engineering: Foundation for Software Quality, REFSQ 2018, 16 pages.

Dam et al., Towards effective AI-powered agile project management, https://arxiv.org/pdf/1812.10578, Dec. 27, 2018, 5 pages.

Duran, et al., User Story Estimation Based on the Complexity Decomposition Using Bayesian Networks, ISSN 0361-7688, Programming and Computer Software, 2020, vol. 46, No. 8, Pletades Publishing Ltd., 2020, 15 pages.

Elallaoui, et al., Automatic generation of UML sequence diagrams from user stories in Scrum process, https://ieeexplore.ieee.org/abstract/document/7358415, 2015, 6 pages.

Garcia, et al., Bluejay: A Cross-Tooling Audit Framework For Agile Software Teams, https://arxiv.org/pdf/2103.06798, Mar. 11, 2021, 6 pages.

Gilson, et al., Extracting Quality Attributes from User Stories for Early Architecture Decision Making, Research Gate, Conference Paper- Mar. 2019, 9 pages.

Lucassen et al., Improving agile requirements: the Quality User Story framework and tool, Requirements Eng (2016), 21 pages.

Lucassen, et al., Visualizing User Story Requirements at Multiple Granularity Levels via Semantic Relatedness, International Conference on Conceptual Modeling, Oct. 7, 2016, 14 pages.

Robeer, et al., Automated Extraction of Conceptual Models from User Stories via NLP, Research Gate, Conference Paper—Sep. 2016, 11 pages.

Wautelet, et al., Bridging User Story Sets with the Use Case Model, Springer International Publishing AG 2016, 13 pages.

* cited by examiner

SOFTWARE DEVELOPMENT AUTOMATED ASSESSMENT AND MODIFICATION

BACKGROUND

The present invention generally relates to computer technology and, more specifically, to software development improvements through automated assessment and modification.

A user story is typically an informal, general explanation of a software feature written from the perspective of an end user and/or from the developer perspective. User stories can include many parts used to generate software, resulting in machine executable instructions. There can be a large degree of variation in how user stories are written. User story structure and content can result in a range of outcomes, such as errors or bugs attributable to the user story in software implementing the user story. Further, user story development can raise issues of completeness, understandability, and uniqueness.

SUMMARY

According to one or more embodiments of the present invention, a computer-implemented method includes receiving, by a processing system, a user story for developing software. The processing system characterizes the user story to determine a plurality of attributes. The processing system classifies a complexity of the user story associated with the attributes. The processing system determines a history score of the user story based on a similarity of one or more previously analyzed user stories having a similar complexity. The processing system recommends one or more modifications to the user story to increase alignment of one or more attributes of the user story with the one or more previously analyzed user stories.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
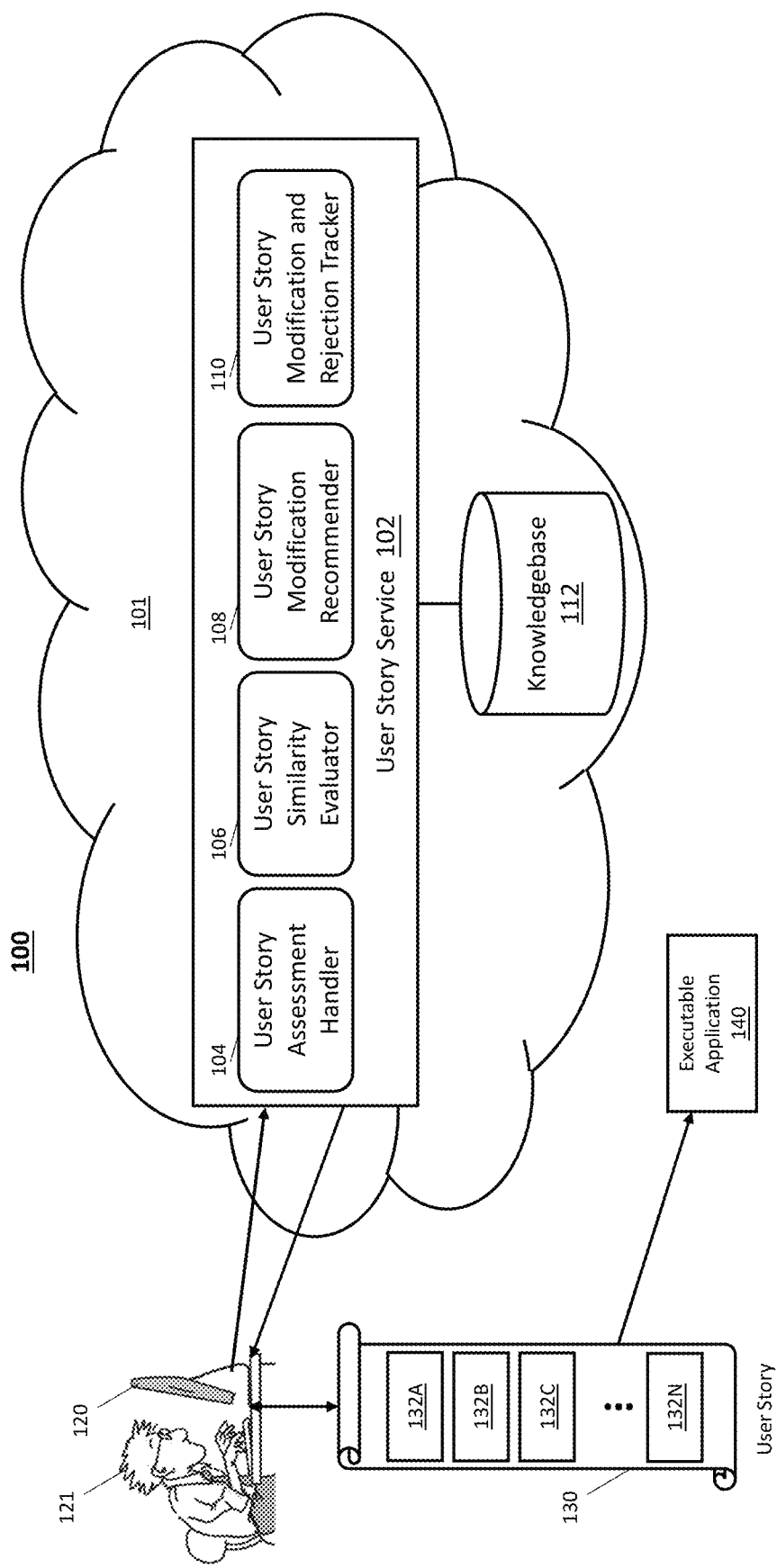
FIG. 1 depicts a system according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted, or modified. Also, the term "coupled", and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Technical solutions are described herein to improve software development to reduce software errors and utilize resources efficiently. Embodiments of the present invention address technical challenges that are rooted in computing technology, particularly software development systems, and more specifically user story improvement in a software development process. Embodiments of the present invention address technical challenges described herein by providing a software development user story improvement recommendation system based on quality-assessment, knowledge-based and software development ontologies, user story modification and rejection tracking, and user-feedback-based supervised machine learning. The system, as further described herein, can reduce software development time, reduce errors, improve resource utilization, and improve consistency of computer program product outputs.

Embodiments of the present invention facilitate software development through user stories. A computer-implemented process for validating the quality of user stories in software development can include, in response to receiving a story created by a user, characterizing the story using a trained machine learning model with story software development ontology classification to extract text items including persona, action, expected outcome, failure path, acceptance criteria, and/or justification. The process can classify skills and a complexity level to develop and complete the user story using historical information of similar user stories and a trained machine learning cluster algorithm to cluster stories in skills for development and complexity levels. A history score can be computed using information such as a number and qualification of comments in systems that host a description of the stories, a number of and qualification of changes to an original user story, a time between a development ready story and actual deployment of the story, and/or a number of and qualification of user test rejections associated with the story. Stories not meeting a predetermined minimum score can be discarded based on a lower limit calculated using an average score of selected stories. In response to receiving output of a classification model for quality, skills, and/or complexity level, recommended improvements can be generated and provided to a user for story verbiage and features. One of a rejection and an acceptance can be received in response to prompting the user with the recommended improvements. In response to receiving a rejection, improvement feedback can be processed by the classification model and used to update recommended improvements. In response to receiving the acceptance, the story can be marked as complete. The historical information can be updated using an accepted story for use in future model training.

Embodiments can use a combination of machine learning and artificial intelligence techniques. For example, user stories can be analyzed using natural language processing and compared with a knowledgebase of previously analyzed user stories and software development ontologies that define development pattern hierarchies for a variety of software development models. Unsupervised machine learning can be used for story complexity classification. Supervised machine learning can be used to incorporate user feedback to refine the quality of story improvement suggestions.

Turning to the drawings, FIG. 1 depicts a system 100 according to one or more embodiments of the present invention. The system 100 includes a user story service 102, which can include a user story assessment handler 104, a user story similarity evaluator 106, a user story modification recommender 108, and a user story modification and rejection tracker 110. The user story service 102 can be implemented in a processing environment 101, such as a cloud computing environment, that interfaces with a knowledgebase 112 that may be located within the processing environment 101 or distributed elsewhere. A user system 120 can interface with the processing environment 101 such that a user 121 of the user system 120 can develop a user story 130 for evaluation by the user story service 102. The user story 130 can include multiple parts 132A, 132B, 132C, . . . , 132N that can be evaluated by the user story service 102 to determine whether the parts 132A-132N of the user story 130 are clear or unclear. Where one or more of the parts 132A-132N are evaluated as being unclear, the user story service 102 can output recommendations for modifications to enhance clarity and/or other aspects that reduce bugs in software generated to implement the user story 130, such as executable application 140. Further details regarding the user story assessment handler 104, user story similarity evaluator 106, user story modification recommender 108, and user story modification and rejection tracker 110 are provided with respect to FIGS. 2-6 as further described herein. The processing environment 101 and user system 120 can be implemented with one or more processing systems using one or more computer systems as further described in reference to FIGS. 7-9.

Figure 2:
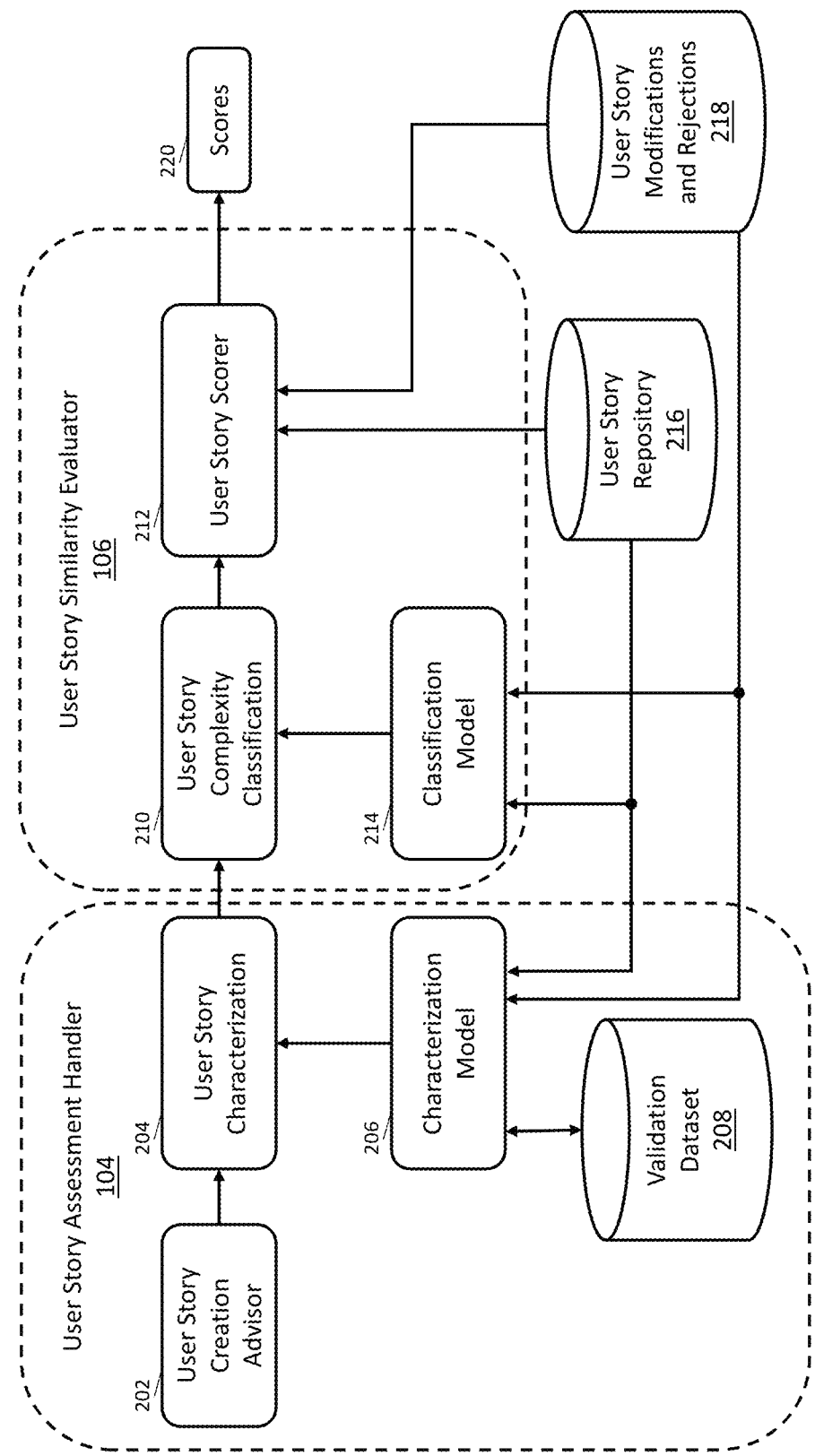
FIG. 2 depicts a block diagram of portions of a user story assessment handler and a user story similarity evaluator according to one or more embodiments of the present invention.

FIG. 2 depicts a block diagram of portions of user story assessment handler 104 and user story similarity evaluator 106 of FIG. 1 according to one or more embodiments of the present invention. The user story assessment handler 104 can include a user story creation advisor 202 that receives the user story 130 of FIG. 1 and include a user interface configured to interact with the user system 120 of FIG. 1. The user story creation advisor 202 can process the parts 132A-132N of the user story 130 separately to identify lower-level issues and manage the parts 132A-132N collectively to support higher-level design pattern analysis. The user story assessment handler 104 may also seek input from the user 121 of the user system 120 to confirm whether the user story 130 incorporates a unique design pattern to be used for training purposes.

The user story assessment handler 104 can also include user story characterization 204. The user story characterization 204 can identify elements of the user story 130 and make a quality assessment over needed story attributes to result in higher quality and detailed information for a task to be performed. The user story characterization 204 can extract text items from the user story 130, such as persona, action, expected outcome, failure path, acceptance criteria, justification, and/or other such attributes. The user story characterization 204 can also detect whether the user story 130 has complete elements defined according to a characterization model 206.

The characterization model 206 can be trained, for example, using natural language processing based on a convolutional neural network (CNN) to identify patterns and perform classification. To train the characterization model 206, a validation dataset 208 can be curated by experts, such as developers and/or teams based on one or more previously analyzed user stories and the associated outcomes. The outcomes can be quantified based at least in part on the success of the implementation of the previously analyzed user stories, the number of bugs related to the previously analyzed user stories, comments associated with descriptions of the one or more previously analyzed user stories, and/or test history, such as a number and qualification of user test rejections. In some embodiments, the CNNs can be implemented as unsupervised models in combination with the validation dataset 208.

Figure 3:
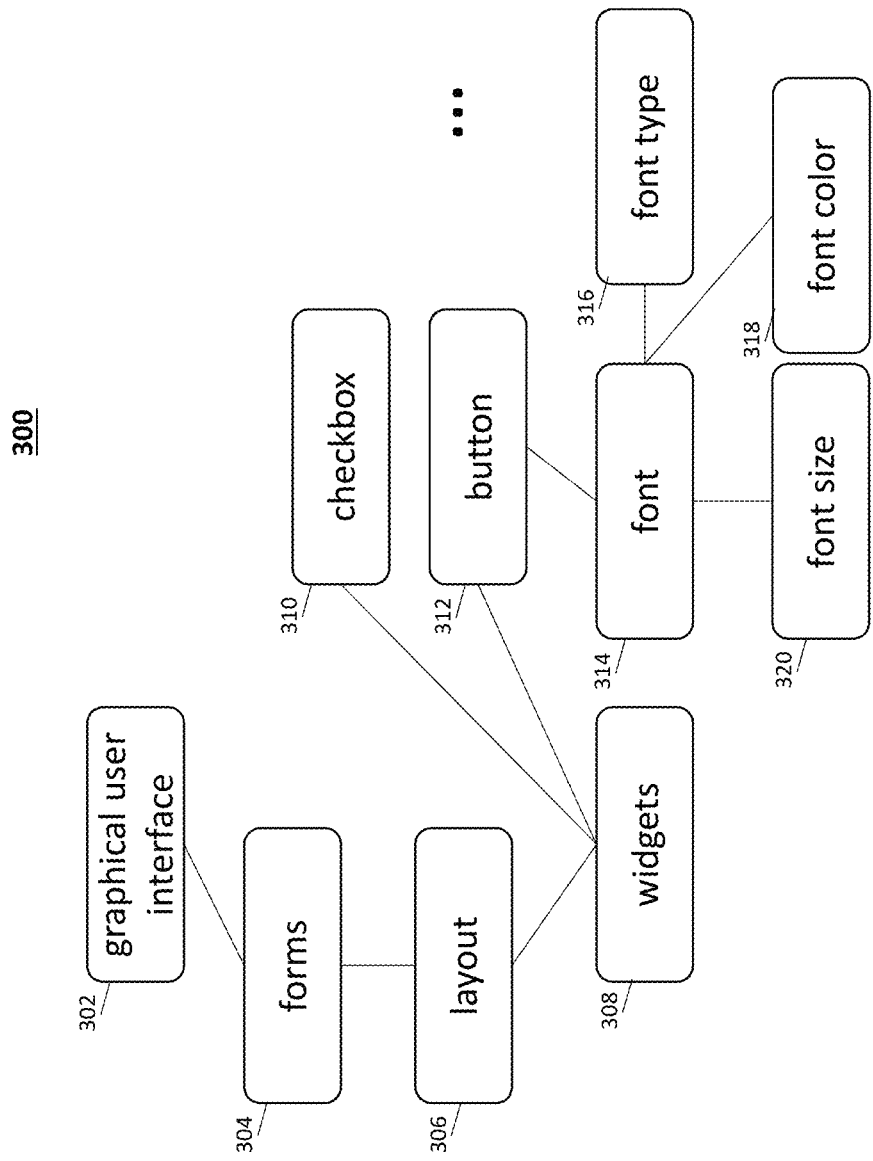
FIG. 3 depicts an example of a graphical user interface ontology according to one or more embodiments of the present invention.
Figure 4:
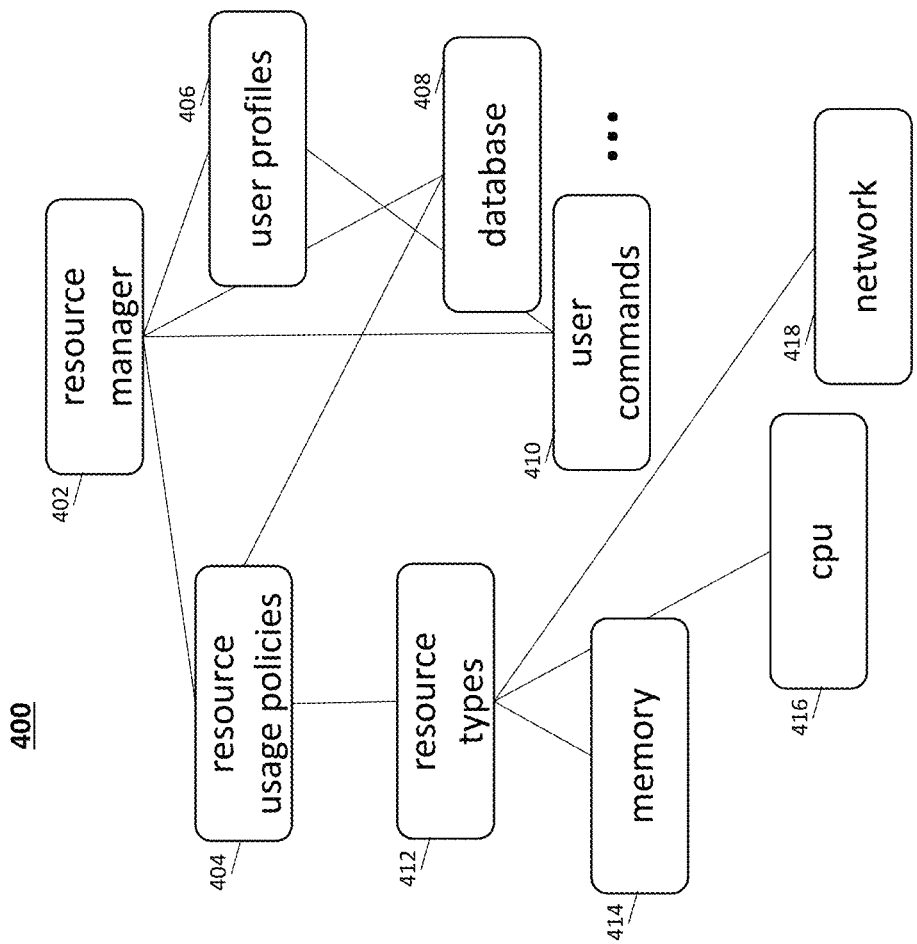
FIG. 4 depicts an example of a resource manager ontology according to one or more embodiments of the present invention.

The characterization model 206 can be associated with one or more software development ontologies, such that different types of software under development can be characterized with respect to similar types of software. For example, a graphical user interface ontology 300 of FIG. 3 for developing graphical user interface software differs from a resource manager ontology 400 of FIG. 4 for developing resource manager software. As depicted in the example of FIG. 3, the graphical user interface ontology 300 can include a design pattern for a graphical user interface 302 including forms 304 each having a layout 306 that can include widgets 308. The widgets 308 can incorporate multiple elements, such as one or more instances of a checkbox 310 and/or button 312. The button 312 can be specified down to a low level of detail, such as a font 314 having a font type 316, a font color 318, and a font size 320. The graphical user interface 302 can include many other details that are not depicted in the example of FIG. 3 for purposes of explanation. As depicted in the example of FIG. 4, the resource manager ontology 400 can include a design pattern for a resource manager 402 including resource usage policies 404 and user profiles 406. The resource usage policies 404, user profiles 406, and other aspects of the resource manager 402 can interact with a database 408. The resource manager 402 and user profiles 406 can also support user commands 410. The resource usage policies 404 can be defined with respect to resource types 412, such as memory resources 414, processing resources 416, and/or network resources 418. The resource manager 402 can include many other details that are not depicted in the example of FIG. 4 for purposes of explanation. As can be seen through these examples, a wide variety of different types of software development captured in the user story 130 of FIG. 1 can be supported through software development ontologies used by characterization model 206 of FIG. 2 based on a closest matching design pattern.

Returning to FIG. 2, the user story similarity evaluator 106 can include user story complexity classification 210 and a user story scorer 212. The user story complexity classification 210 can classify skills and a complexity level to develop and complete the user story 130 of FIG. 1. Attributes such as persona, action, expected outcome, failure path, acceptance criteria, justification, and/or other such parameters identified by the user story characterization 204 can be analyzed by the user story complexity classification 210. Attributes from the developer perspective can also be analyzed by the user story complexity classification 210, such as environment, priority, type, steps, tasks, and/or other such parameters associated with skill and complexity determination. Based on this information, historical information of similar user stories from a user story repository 216 can be analyzed. The classification model 214 can apply a machine learning cluster algorithm to cluster stories in skills required for development and complexity levels based on one or more previously analyzed user stories from the user story repository 216.

The classification model 214 can be trained using a data set of user stories from the user story repository 216. Training updates of the classification model 214 can be performed according to different schedules or time intervals (e.g., once a week, once every other week, etc.). In some embodiments, the creation of the classification model 214 can be performed using unsupervised machine learning, such as K-means. Examples of the type of features that can be extracted from the user story 130 and the one or more previously analyzed user stories can include: an environment where the user story 130 will be implemented, a priority of the user story 130, a complexity based on story points, a user story type (e.g., new feature vs. updated feature), user story steps to be executed by the user 121 of FIG. 1, user story tasks related to the completion of development, time between development being ready and actual deployment, and other such features. Further, the classification model 214 can be trained to detect skills required for implementing user stories by developers in front-end services, where the stories were not completed in a required time because of missing/delayed back-end service skills.

The user story similarity evaluator 106 can perform story-based history analysis after story classification. The user story similarity evaluator 106 can evaluate the user story 130 with any existing data, for example, depending on whether the user story 130 is an update to a previous user story in the user story repository 216. The user story similarity evaluator 106 can also evaluate other previously analyzed user stories having a similar complexity in the user story repository 216. The user story scoring can be used to filter out contents of the user story repository 216 to identify which data sets are determined to be most relevant for making modification recommendations as text-based improvements to wording or to identify missing/incomplete features. As an example, scores 220 can be computed based on one or more of: a number and qualification of comments in systems that host the description of the stories, a number and qualification of changes to the original user story, time of between development being ready and actual deployment, and/or a test history of the one or more previously analyzed user stories, such as a number and qualification of user test rejections. After the scores 220 are computed by the user story scorer 212, any stories that do not meet a minimum value can be discarded from consideration. The minimum value can be determined based on a lower limit calculated using an average score of the selected stories.

When the suggested modifications are provided for consideration by the user 121 of FIG. 1, the results of any feedback, such as feedback indicating whether each of the one or more modifications were accepted or rejected, can be captured in user story modifications and rejections 218. The acceptance or rejection information captured in the user story modifications and rejections 218 can be used for further training the characterization model 206, the classification model 214, and/or other models used by the user story service 102 of FIG. 1. The validation dataset 208, characterization model 206, the classification model 214, user story repository 216, user story modifications and rejections 218, software development ontologies, and other supporting data can be stored, for example, in the knowledgebase 112 of FIG. 1.

Figure 5:
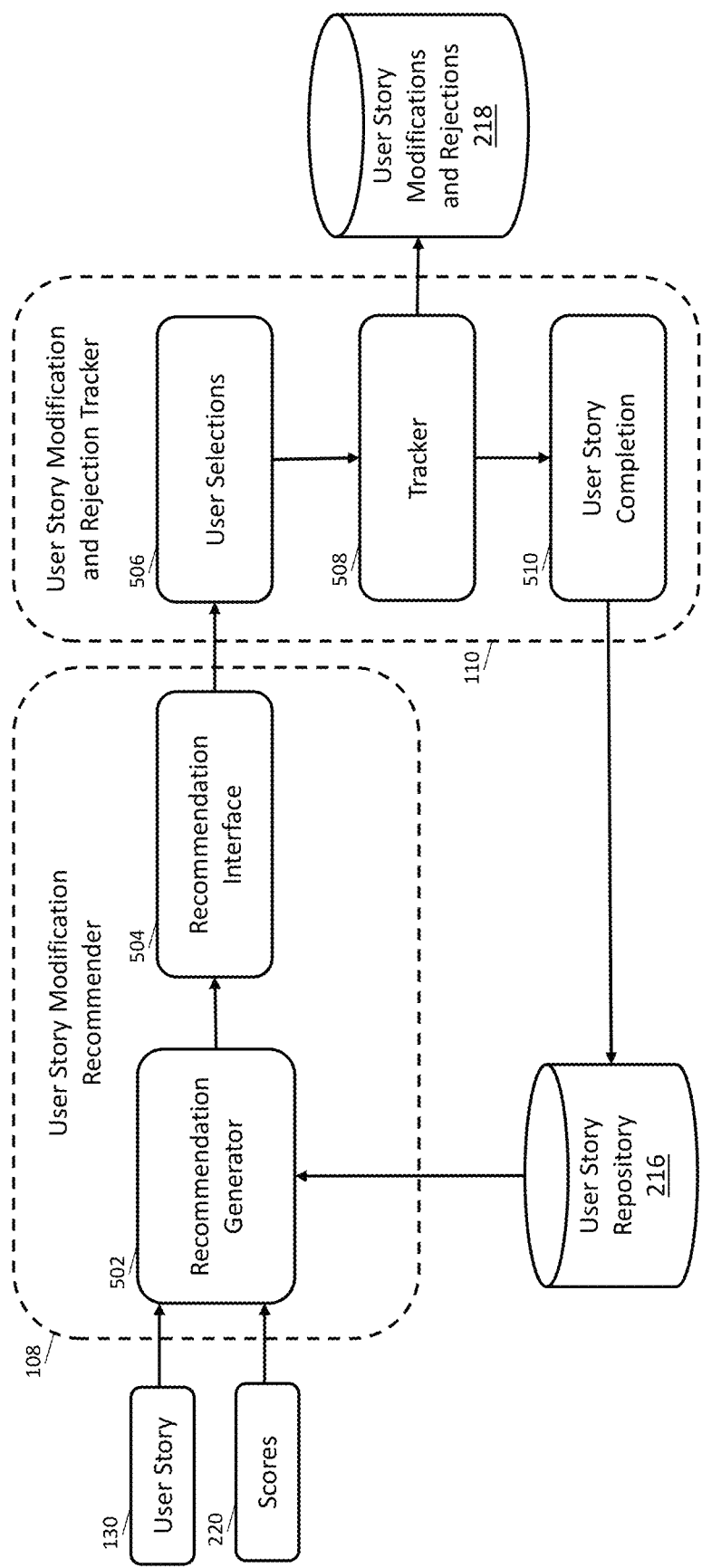
FIG. 5 depicts a block diagram of portions of a user story modification recommender and a user story modification and rejection tracker according to one or more embodiments of the present invention.

FIG. 5 depicts a block diagram of portions of the user story modification recommender 108 and user story modification and rejection tracker 110 of FIG. 1 according to one or more embodiments of the present invention. The user story modification recommender 108 can include a recommendation generator 502 that receives scores 220 from the user story scorer 212 and generates suggested modifications to one or more parts 132A-132N of the user story 130 of FIG. 1 to increase user story feature similarity without producing a duplication of user stories. For example, the recommendation generator 502 can recommend improvements to the user story 130 based on the story verbiage and features through the outputs of the classification model 214 for quality, skills, and complexity level. Recommendations can be based on a natural language processing model, such as Word2Vec, to calculate the words based on scores 220 and a number of occurrences. The recommendations can be provided to the user 121 through a recommendation interface 504, allowing acceptance or rejection of proposed modifications.

The user story modification and rejection tracker 110 can receive user selections 506 from the recommendation interface 504 as feedback from the user 121 of the user system 120 of FIG. 1. If a recommendation is rejected by the user 121, improvement feedback can be captured in the user story modifications and rejections 218. The user story modifications and rejections 218 can be used, for example, to improve training of other models, such as the classification model 214 of FIG. 2. User story completion can monitor for the tracker 508 to confirm that all of the recommended modifications have been accepted or rejected. Upon acceptance or rejection of all recommendations, the user story completion 510 can mark the user story 130 as complete and store the user story 130 along with supporting analysis information in the user story repository 216 for later use. The user story completion 510 can also assign the user story 130 to a log or work queue for further processing, such as source code generation to produce the executable application 140 of FIG. 1.

Figure 6:
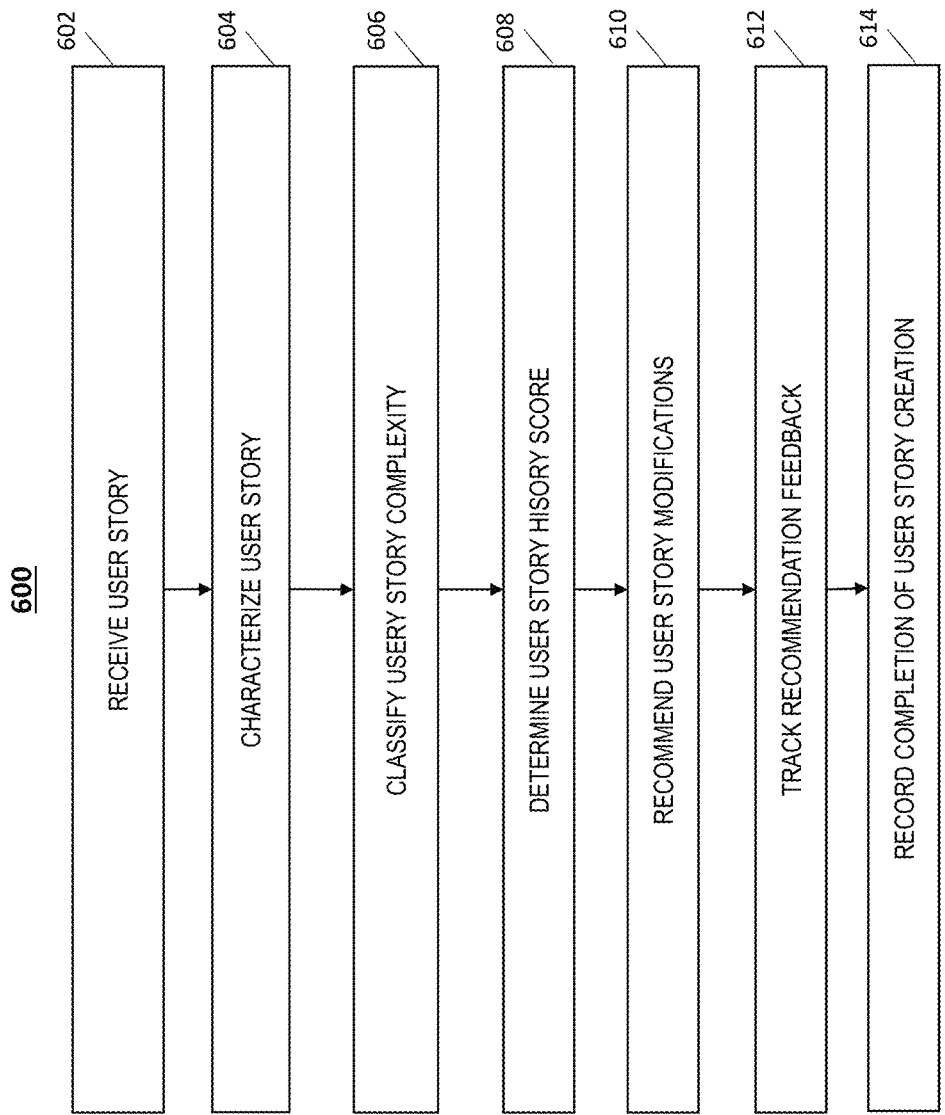
FIG. 6 depicts a flowchart of a method according to one or more embodiments of the present invention.

FIG. 6 depicts a flowchart of a method 600 for software development according to one or more embodiments of the present invention. The method 600 is described with respect to FIGS. 1-6. Although the method 600 is depicted in a particular order, it will be understood that some steps may be performed in a different order and may be combined or further divided into additional steps. The method 600 that is depicted in FIG. 6 can be implemented using a computer system and/or cloud-based system as further described herein in reference to FIGS. 7-9, where a processing system can be a central processing unit, one or more computer processors, and/or distributed processing resources spread between multiple computer systems.

At block 602, a user story service 102 can receive a user story 130 for developing software. The user story 130 may be in an object or file or distributed between multiple objects or files. The user story 130 can be stored, at least in part, in a text-based format for text-based analysis and processing.

At block 604, the user story service 102 can characterize the user story 130 to determine a plurality of attributes. Characterizing the user story 130 can be performed by user story characterization 204 using a characterization model 206 with one or more software development ontologies to identify a plurality of story elements and make a quality assessment over a plurality of needed story attributes.

At block 606, the user story service 102 can classify complexity of the user story 130 associated with the attributes. A classification model 214 can be used to classify one or more skills and complexity level to develop and complete the user story 130 using unsupervised machine learning in some embodiments.

At block 608, the user story service 102 can compute a history score (e.g., one or more of the scores 220) of the user story 130 based on a similarity of one or more previously analyzed user stories having a similar complexity. The history score can be determined based at least in part on one or more comments associated with descriptions of the one or more previously analyzed user stories, a change history of the user story 130, a time between development and deployment of the one or more previously analyzed user stories, and a test history of the one or more previously analyzed user stories.

At block 610, the user story service 102 can recommend one or more modifications to the user story 130 to increase alignment of one or more attributes of the user story 130 with the one or more previously analyzed user stories. The one or more modifications to the user story 130 can be recommended as one or more of a change in wording of the user story 130, a change in a feature of the user story 130, and an addition of a missing aspect of the user story 130.

At block 612, the user story service 102 can track recommendation feedback. Feedback to the one or more modifications as recommended can be received through the recommendation interface 504 as user selections 506. The feedback can indicate whether each of the one or more modifications were accepted or rejected. The feedback can be provided as training data to a classification model 214 used to perform classifying, such as classifying performed by the user story complexity classification 210 and/or other classifiers.

At block 614, the user story service 102 can record completion of creation of the user story 130. The user story completion 510 can mark the user story as complete based on determining that the feedback is complete through the tracker 508. The user story 130 and analysis information can be added to a knowledgebase 112 with the one or more previously analyzed user stories, for instance, as part of the user story repository 216.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
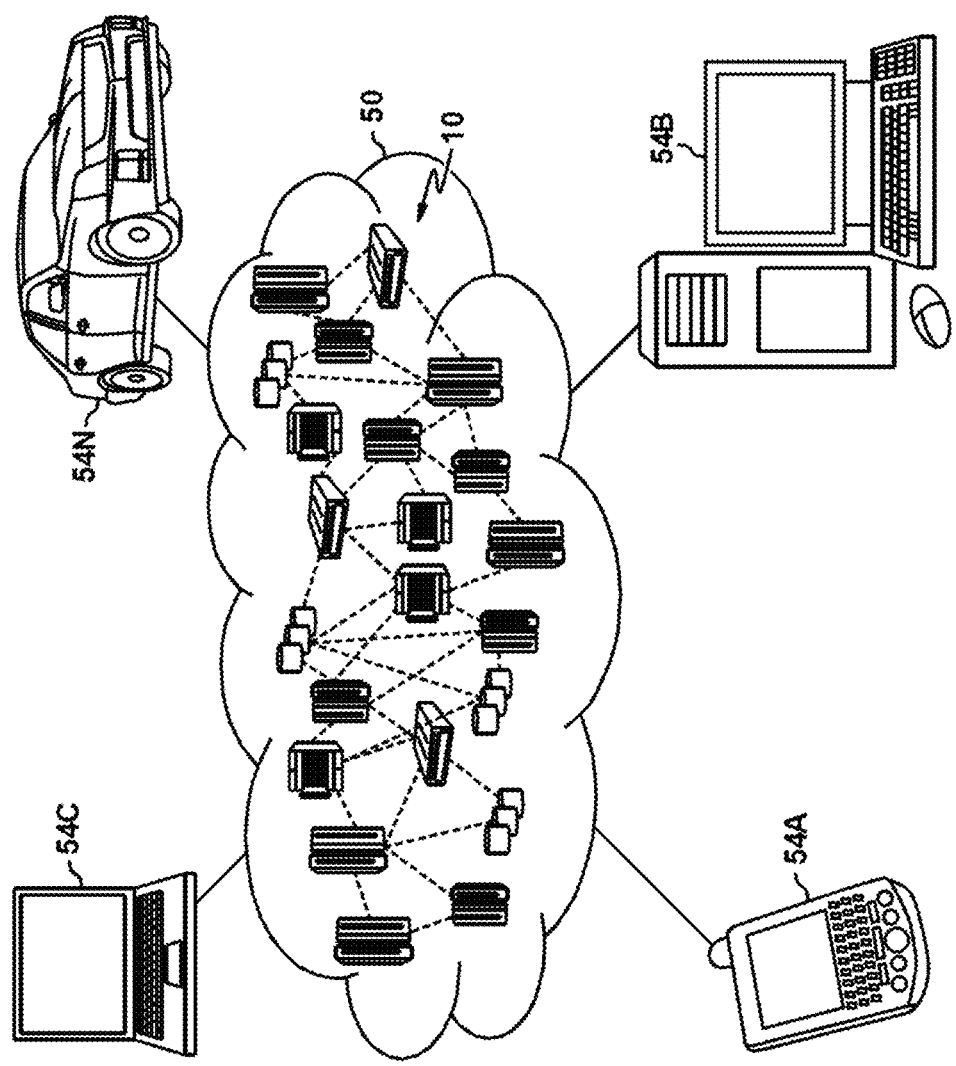
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
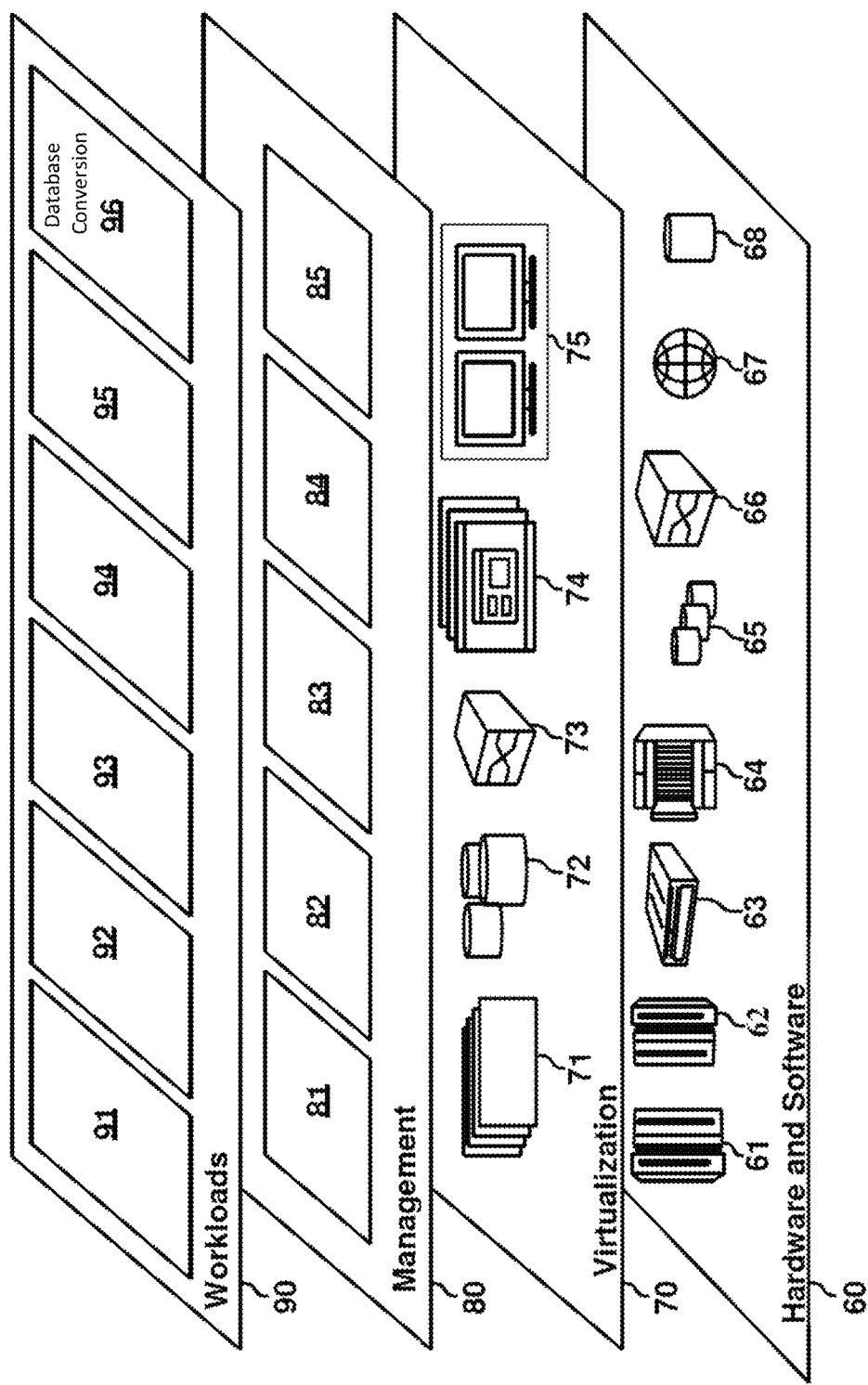
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user story processing 96 that implements at least a portion of system 100 of FIG. 1, such as user story service 102 and knowledgebase 112.

Figure 9:
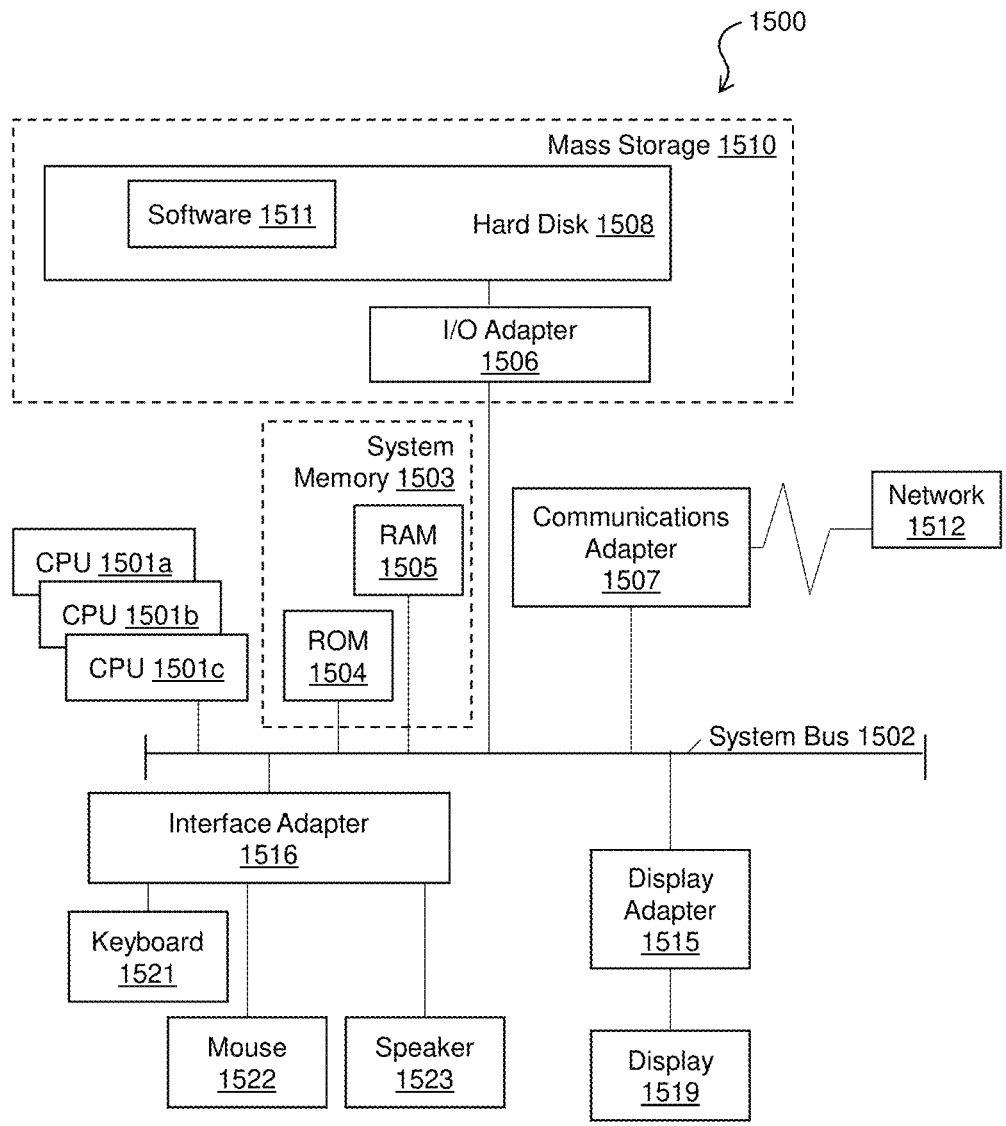
FIG. 9 depicts a computing system according to one or more embodiments of the present invention.

Turning now to FIG. 9, a computer system 1500 is generally shown in accordance with an embodiment. The computer system 1500 can be a computing system being used to operate the system 100 of FIG. 1. The computer system 1500 can be an electronic, computer framework comprising and/or employing any number and combination of computing devices and networks utilizing various communication technologies, as described herein. The computer system 1500 can be easily scalable, extensible, and modular, with the ability to change to different services or reconfigure some features independently of others. The computer system 1500 may be, for example, a server, desktop computer, laptop computer, tablet computer, or smartphone. In some examples, computer system 1500 may be a cloud computing node. Computer system 1500 may be described in the general context of computer system executable instructions, such as program modules, being executed by a computer system. Generally, program modules may include routines, programs, objects, components, logic, data structures, and so on that perform particular tasks or implement particular abstract data types. Computer system 1500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system 1500 has one or more central processing units (CPU(s)) 1501a, 1501b, 1501c, etc. (collectively or generically referred to as processor(s) 1501). The processors 1501 can be a single-core processor, multi-core processor, computing cluster, or any number of other configurations. The processors 1501, also referred to as processing circuits, are coupled via a system bus 1502 to a system memory 1503 and various other components. The system memory 1503 can include a read only memory (ROM) 1504 and a random access memory (RAM) 1505. The ROM 1504 is coupled to the system bus 1502 and may include a basic input/output system (BIOS), which controls certain basic functions of the computer system 1500. The RAM is read-write memory coupled to the system bus 1502 for use by the processors 1501. The system memory 1503 provides temporary memory space for operations of said instructions during operation. The system memory 1503 can include random access memory (RAM), read only memory, flash memory, or any other suitable memory systems.

The computer system 1500 comprises an input/output (I/O) adapter 1506 and a communications adapter 1507 coupled to the system bus 1502. The I/O adapter 1506 may be a small computer system interface (SCSI) adapter that communicates with a hard disk 1508 and/or any other similar component. The I/O adapter 1506 and the hard disk 1508 are collectively referred to herein as a mass storage 1510.

Software 1511 for execution on the computer system 1500 may be stored in the mass storage 1510. The mass storage 1510 is an example of a tangible storage medium readable by the processors 1501, where the software 1511 is stored as instructions for execution by the processors 1501 to cause the computer system 1500 to operate, such as is described herein below with respect to the various Figures. Examples of computer program product and the execution of such instruction is discussed herein in more detail. The communications adapter 1507 interconnects the system bus 1502 with a network 1512, which may be an outside network, enabling the computer system 1500 to communicate with other such systems. In one embodiment, a portion of the system memory 1503 and the mass storage 1510 collectively store an operating system, which may be any appropriate operating system, such as the z/OS or AIX operating system from IBM Corporation, to coordinate the functions of the various components shown in FIG. 9.

Additional input/output devices are shown as connected to the system bus 1502 via a display adapter 1515 and an interface adapter 1516 and. In one embodiment, the adapters 1506, 1507, 1515, and 1516 may be connected to one or more I/O buses that are connected to the system bus 1502 via an intermediate bus bridge (not shown). A display 1519 (e.g., a screen or a display monitor) is connected to the system bus 1502 by a display adapter 1515, which may include a graphics controller to improve the performance of graphics intensive applications and a video controller. A keyboard 1521, a mouse 1522, a speaker 1523, etc. can be interconnected to the system bus 1502 via the interface adapter 1516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 9, the computer system 1500 includes processing capability in the form of the processors 1501, and storage capability including the system memory 1503 and the mass storage 1510, input means such as the keyboard 1521 and the mouse 1522, and output capability including the speaker 1523 and the display 1519.

In some embodiments, the communications adapter 1507 can transmit data using any suitable interface or protocol, such as the internet small computer system interface, among others. The network 1512 may be a cellular network, a radio network, a wide area network (WAN), a local area network (LAN), or the Internet, among others. An external computing device may connect to the computer system 1500 through the network 1512. In some examples, an external computing device may be an external webserver or a cloud computing node.

It is to be understood that the block diagram of FIG. 9 is not intended to indicate that the computer system 1500 is to include all of the components shown in FIG. 9. Rather, the computer system 1500 can include any appropriate fewer or additional components not illustrated in FIG. 9 (e.g., additional memory components, embedded controllers, modules, additional network interfaces, etc.). Further, the embodiments described herein with respect to computer system 1500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving, by a processing system, a user story for developing software;
    characterizing, by the processing system, the user story to determine a plurality of attributes, wherein characterizing the user story is performed using a characterization model with one or more software development ontologies to identify a plurality of story elements and make a quality assessment over a plurality of needed story attributes, and the one or more software development ontologies define development pattern hierarchies for a variety of software development models;
    classifying, by the processing system, a complexity of the user story associated with the attributes using a classification model;
    determining, by the processing system, a history score of the user story based on a similarity of one or more previously analyzed user stories having a similar complexity;
    recommending, by the processing system, one or more modifications to the user story to increase alignment of one or more attributes of the user story with the one or more previously analyzed user stories;
    receiving feedback to the one or more modifications as recommended, the feedback indicating whether each of the one or more modifications were accepted or rejected; and
    providing the feedback as training data to the classification model used to perform the classifying, wherein the classification model is refined using supervised machine learning based on the feedback.

2. The computer-implemented method of claim 1, further comprising:
    marking the user story as complete based on determining that the feedback is complete; and
    adding the user story and analysis information to a knowledgebase with the one or more previously analyzed user stories.

3. The computer-implemented method of claim 1, wherein the classification model classifies one or more skills and complexity level to develop and complete the user story using unsupervised machine learning.

4. The computer-implemented method of claim 1, wherein the history score is determined based at least in part on:
    one or more comments associated with descriptions of the one or more previously analyzed user stories;
    a change history of the user story;

a time between development and deployment of the one or more previously analyzed user stories; and a test history of the one or more previously analyzed user stories.

5. The computer-implemented method of claim 1, wherein the one or more modifications to the user story are recommended as one or more of: a change in wording of the user story, a change in a feature of the user story, and an addition of a missing aspect of the user story.

6. A system comprising:

a memory having computer readable instructions; and one or more processors for executing the computer readable instructions, the computer readable instructions controlling the one or more processors to perform operations comprising:

receiving a user story for developing software;

characterizing the user story to determine a plurality of attributes, wherein characterizing the user story is performed using a characterization model with one or more software development ontologies to identify a plurality of story elements and make a quality assessment over a plurality of needed story attributes, and the one or more software development ontologies define development pattern hierarchies for a variety of software development models;

classifying a complexity of the user story associated with the attributes using a classification model;

determining a history score of the user story based on a similarity of one or more previously analyzed user stories having a similar complexity;

recommending one or more modifications to the user story to increase alignment of one or more attributes of the user story with the one or more previously analyzed user stories;

receiving feedback to the one or more modifications as recommended, the feedback indicating whether each of the one or more modifications were accepted or rejected; and providing the feedback as training data to the classification model used to perform the classifying, wherein the classification model is refined using supervised machine learning based on the feedback.

7. The system of claim 6, wherein the computer readable instructions are configured to control the one or more processors to perform operations comprising:

marking the user story as complete based on determining that the feedback is complete; and adding the user story and analysis information to a knowledgebase with the one or more previously analyzed user stories.

8. The system of claim 6, wherein the classification model classifies one or more skills and complexity level to develop and complete the user story using unsupervised machine learning.

9. The system of claim 6, wherein the history score is determined based at least in part on:

one or more comments associated with descriptions of the one or more previously analyzed user stories;

a change history of the user story;

a time between development and deployment of the one or more previously analyzed user stories; and a test history of the one or more previously analyzed user stories.

10. The system of claim 6, wherein the one or more modifications to the user story are recommended as one or more of: a change in wording of the user story, a change in a feature of the user story, and an addition of a missing aspect of the user story.

11. A computer program product comprising a computer readable storage medium having program instructions embodied therewith, the program instructions executable by one or more processors to cause the one or more processors to perform operations comprising:

receiving a user story for developing software;

characterizing the user story to determine a plurality of attributes, wherein characterizing the user story is performed using a characterization model with one or more software development ontologies to identify a plurality of story elements and make a quality assessment over a plurality of needed story attributes, and the one or more software development ontologies define development pattern hierarchies for a variety of software development models;

classifying a complexity of the user story associated with the attributes using a classification model;

determining a history score of the user story based on a similarity of one or more previously analyzed user stories having a similar complexity;

recommending one or more modifications to the user story to increase alignment of one or more attributes of the user story with the one or more previously analyzed user stories receiving feedback to the one or more modifications as recommended, the feedback indicating whether each of the one or more modifications were accepted or rejected; and providing the feedback as training data to the classification model used to perform the classifying, wherein the classification model is refined using supervised machine learning based on the feedback.

12. The computer program product of claim 11, wherein the program instructions are executable by the one or more processors to cause the one or more processors to perform operations comprising:

marking the user story as complete based on determining that the feedback is complete; and adding the user story and analysis information to a knowledgebase with the one or more previously analyzed user stories.

13. The computer program product of claim 11, wherein the history score is determined based at least in part on:

one or more comments associated with descriptions of the one or more previously analyzed user stories;

a change history of the user story;

a time between development and deployment of the one or more previously analyzed user stories; and a test history of the one or more previously analyzed user stories.

14. The computer program product of claim 11, wherein the one or more modifications to the user story are recommended as one or more of: a change in wording of the user story, a change in a feature of the user story, and an addition of a missing aspect of the user story.

\* \* \* \* \*